US 6,583,823 B1

(12) United States Patent
Shimada et al.

(10) Patent No.: US 6,583,823 B1
(45) Date of Patent: Jun. 24, 2003

(54) METHODS, APPARATUSES, AND MEDIUMS FOR REPAIRING A PIXEL ASSOCIATED WITH MOTION-PICTURE PROCESSES

(75) Inventors: Shigehiro Shimada, Tokyo (JP); Takashi Totsuka, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/126,005

(22) Filed: Jul. 29, 1998

(30) Foreign Application Priority Data

Aug. 1, 1997  (JP) ............................................. 9-208208

(51) Int. Cl.[7] ................................................. H04N 5/21
(52) U.S. Cl. ...................................... 348/616; 348/607
(58) Field of Search ................................ 348/616, 700, 348/619, 620, 624; 382/260, 275; 345/723

(56) References Cited

U.S. PATENT DOCUMENTS

| 5,148,278 | A | * | 9/1992 | Wischermann | ............... | 358/167 |
| 5,959,693 | A | * | 9/1999 | Wu et al. | .................... | 348/624 |
| 5,978,047 | A | * | 11/1999 | May | ........................... | 348/616 |
| 6,094,231 | A | * | 7/2000 | Wischer-mann | ............ | 348/607 |

* cited by examiner

Primary Examiner—Victor R. Kostak
(74) Attorney, Agent, or Firm—Bell, Boyd & Lloyd LLC

(57) ABSTRACT

Intra-frame repair is applied to an area to be repaired which lacks image information in a frame. Matching between the area to be repaired in the frame and areas in adjacent frames is performed to obtain the corresponding areas in the adjacent frames and average processing is applied to pixels to be repaired among continuous frames. Thus, a motion picture is repaired.

21 Claims, 14 Drawing Sheets

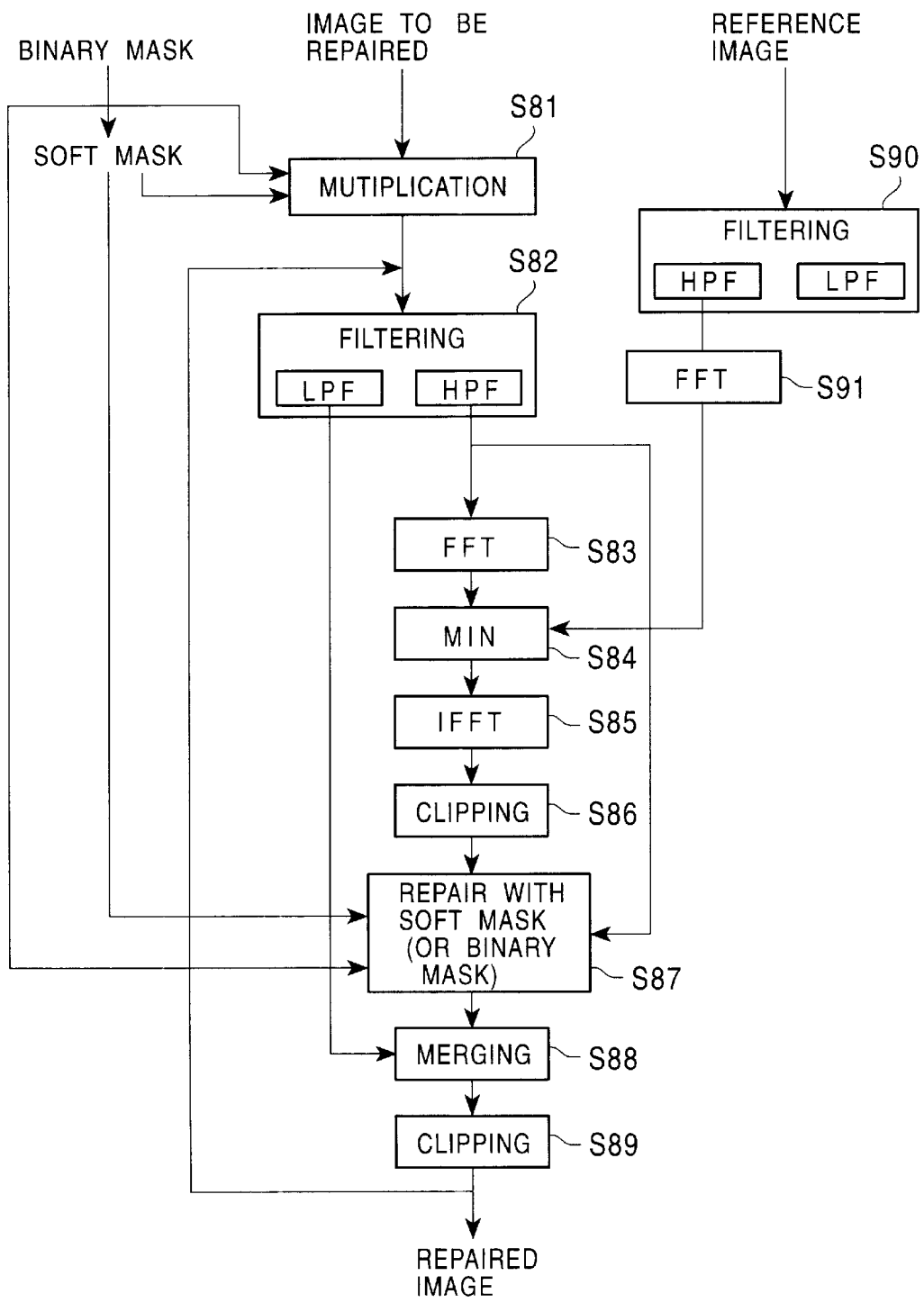

METHODS, APPARATUSES, AND MEDIUMS FOR REPAIRING A PIXEL ASSOCIATED WITH MOTION-PICTURE PROCESSES

BACKGROUND OF THE INVENTION

1. Field of the Invention

The present invention relates to a method and an apparatus for removing a scratch, an unnecessary element, and noise from a digitized motion picture to repair the motion picture.

2. Description of the Related Art

An old movie film usually has much dust and a lot of scratches. When such a film is electronically read through a scanner and converted to a digital picture, it is necessary to electronically remove dust and scratches. Since what the original image should be cannot be found, pixels at the dust and scratches have no information. It is necessary to repair the image according to the information of surrounding pixels.

In a recent movie, a special effect is employed in many cases in which a scene is taken with an actor or a vehicle flying in the air by the use of wire and the wire is electronically deleted afterwards. Also in such cases, since portions hidden by the wire, which should have been seen, cannot be repaired from the taken film, it is necessary to reproduce them. This can be handled as a case for repairing a pixel which lacks its information.

In addition, for an image in which an error occurs during radio transfer or computer-network transfer, it is required to use a repair technique to make a defect caused by the error inconspicuous.

To retouch an image, the most traditional and the most widely used method is retouching by hands. Software (called paint software) which implements on a computer an operation for drawing a picture on paper with a pen or an air brush is used to remove a scratch in an image by drawing a figure on the image by the use of an electronic pen or an electronic brush.

It is of course a hard job to repair one frame completely. It is further difficult to repair a motion picture. In other words, even the same pixels in frames are not uniformly retouched since hand retouching is used, and as a result, if each frame is acceptably retouched when seen independently, a human eye notices retouching discontinuity in the time domain as noise when the motion picture formed of the frames is continuously seen. Removing this noise is extremely difficult. It is needless to say that this work requires time and skill. It is not rare that retouching a motion picture formed of about 100 frames takes about one week, and this is a large factor to reduce time efficiency in video operations in a movie or a video product.

An attempt has been made to automate image repair with the use of computer image processing in order to make the work efficiently.

A typical case is the use of an image processing filter. With the use of a low-pass filter (low-frequency passing filter), for example, portions which lack information are blurred to fit the surroundings. Repair is possible to some extent. Just with a low-pass filter, the entire image become blurred. To improve this point, many filters have been examined, including a median filter, which uses statistical operations. An image-repair technique using such a filter is described in detail, for example, in "Fundamentals of digital image processing" written by A. K. Jain, Prentice hall, which is one of main books in image processing. These filters are mainly useful for a lack of information at a small, discrete pixel, but are not suited to repair a large area formed of continuous pixels.

Therefore, these filters are not sufficient for removing a scratch in an image, for repairing the background after an unnecessary element such as wire is removed, or for repair of burst errors during image transfer.

A scratch in a digital image means unnecessary pixels in the image. Scratch noise is formed of a number of adjacent pixels rather than a small independent group of pixels. In an image, scratch noise is formed of, for example, a pixel area of 10 pixels by 100 pixels, and is positioned in an image area having details such as a texture or an edge cut by the scratch. To remove the scratch from the image, the pixels constituting the scratch area need to represent the original data or to be replaced with data equivalent to the original data. To retouch the scratch area effectively, the pixel data needs to generate at the scratch area an image as sharp as those at the surroundings. It is required that a clear edge be maintained to be continuous and a texture generated to replace the wire or the scratch pixels be harmonized with the surrounding texture.

The effect of a conventional technique in digital processing changes according to an image feature generated regularly or at random and the relative size of the feature in the image. A feature generated regularly includes a texture in a brick wall or a cloth. A feature generated at random includes an asphalt road, a concrete road or sandy beach. The effect of the conventional technique also depends on the size and the type of a scratch area. A small, isolated group of noise pixels in a smooth or blurred area in an image can be relatively easily removed by the use of conventional techniques, such as filtering, cloning, and painting. The conventional noise-removing techniques, however, cannot be applied to a scratch formed of a number of adjacent pixels, or a scratch at a texture area or at an area having conspicuous edge or line in an image. The conventional techniques in image noise removal can be classified into two types, (1) intra-frame technique and (2) inter-frame technique. The difference between these two general techniques is mainly where data which substitutes for a noise pixel is obtained. In the inter-frame technique, a pixel required for substituting for a noise pixel is generally copied from a previous frame or continuous frames. On the other hand, in the intra-frame technique, data in an image frame to be repaired is generally used for substituting for a noise pixel.

The inter-frame technique cannot achieve a good result in a picture in which a camera moves extremely or in a scene having a movement. These techniques cannot be applied either to a case in which a scratch extends to several image frames, or to a case in which a damaged image frame is the only one image frame for providing data used for repairing the image. Unfortunately, a scratch generally extends to a number of image frames due to the movement of a movie film in a general projector. In such a case, the corresponding image data obtained from the previous image frame or continuous image frames cannot be used for substituting for a scratch area or for copying. To remove scratch noise, the conventional techniques provide some methods: (a) low-pass filtering and other linear filtering, (b) median filtering and other non-linear filtering, (c) statistical combination of textures, (d) cloning, including copying other parts in an image, (e) painting by hand, (f) method based on projection, and (g) method based on solving a simultaneous equation. With these methods, the best result cannot be obtained in removing various scratches or in removing a scratch in various image conditions.

It is considered that all image signals are formed of a combination at a certain ratio of many sine-wave signals having different frequencies. To analyze such an image as image components, fast Fourier transform (FFT) is used. Processing for the information generated by FFT is performed in the frequency domain. Direct processing for an image signal is performed in the spatial domain.

The methods (a) to (e) are used in either one of the domains. In methods used in the frequency domain, the structure of the entire image can be obtained, but local processing control (line continuity and clearness) is lost. As a result, a line and other details become unclear.

On the other hand, in methods used only in the spatial domain, local processing control and local information are obtained, but information on the structure of the entire image cannot be obtained. A limitation in a local vicinity is caused by a restriction in actual computer processing in some cases. Some methods similar to intermediate filtering are not capable of using the entire information effectively.

In a conventional image repair method, areas used for repair are obtained from the previous and next frames by copying. As shown in an example illustrated in FIG. 1, the i-th frame 31 shown in B includes a scratch (thick, black portion) 3.

In the figure, the (i−1)-th frame 30 illustrated in A, the i-th frame 31 illustrated in B, and the (i+1)-th frame 32, a moving object 41 moving toward the right bottom is shown at almost the center. At almost the center of the i-th frame 31 shown in B, the almost rectangular scratch 3 extending to almost the right top is included. In the (i−1)-th frame 30 illustrated in A and the (i+1)-th frame 32 illustrated in C, portions 7 having the same shape as the scratch 3, which is included in the i-th frame 31 shown in B, are set at the corresponding positions. Data under the scratch 3 in the i-th frame 31 illustrated in B can be repaired by copying an image area obtained from the portions 7, which are shown by dotted lines in the previous and next frames.

Brightness and shade levels may change among frames in some cases as shown in FIG. 2.

In the figure, the (i−1)-th frame 30 illustrated in A, the i-th frame 31 illustrated in B, and the (i+1)-th frame 32 illustrated in C, a moving object 41 having the same shape as the moving object 41 shown in FIG. 1 is shown. Each of the frames 30 to 32 has different brightness and shade level. As compared with the moving object 41 shown in the i-th frame 31, the moving object 41 shown in the (i−1)-th frame 30 is darker, and the moving object 41 shown in the (i+1)-th frame 32 is brighter. In such a case, color does not match if an area is just copied and pasted. Repair quality is low.

In some cases, a scratch 3 largely overlap among adjacent frames as shown in FIG. 3.

In the figure, the (i−1)-th frame 30 illustrated in A, the i-th frame 31 illustrated in B, and the (i+1)-th frame 32 illustrated in C, a moving object 41 having the same shape as the moving object 41 shown in FIG. 1 is shown. At slightly left of the center of the (i−1)-th frame 30 shown in A, a rectangular scratch 3 extending to almost the upper right is included. At almost the center of the i-th frame 31 shown in B, the rectangular scratch 3, extending to almost the upper right, is included. At slightly right of the center of the (i+1)-th frame 32 shown in C, the rectangular scratch 3, extending to almost the upper right, is included. The scratch 3 largely overlaps among the adjacent frames.

In such a case, it is necessary to obtain data for repair from a frame further apart in the time domain, such as the (i−2)-th frame or the (i+2)-th frame. When a frame further apart in time is referenced, since a difference in a shade level becomes larger, it is difficult to perform a good repair.

As described above, in the conventional techniques, it takes much time to repair a motion picture by hand even by a skilled operator. Even with this work, it is difficult to perform uniform repair over all frames. As a result, repair quality is low.

The conventional computer-repair method does not have a sufficient effect against lack of information at a number of continuous pixels. The method cannot be used for continuous, uniform repair against a motion picture. Even with the technology disclosed in Japanese Patent Application Nos. 7-303420 and 8-204776, which has greatly improved repair precision against a single frame, quality is not good when a motion picture is repaired.

In a method in which repair is performed by copying an image from the previous and next images, when brightness and a shade level change as time elapses, a good result cannot be obtained. If a portion lacking information overlap among adjacent frames, a frame further apart needs to be used. When a frame further apart in time is referenced, however, since a difference in a shade level or a shape becomes larger, it is difficult to repair an image.

As described above, with the conventional methods, a single frame may be repaired with a good result, but a good repair for the entire motion picture is impossible.

SUMMARY OF THE INVENTION

Accordingly, it is an object of the present invention to provide a motion-picture repair method and a motion-picture repair apparatus which allow even a motion picture to be repaired successfully.

The foregoing object is achieved according to one aspect of the present invention through the provision of a motion-picture repair method in which a pixel which lacks information is repaired in a motion picture formed of a plurality of continuous images, including: a continuity maintaining step for repairing the pixel which lacks information such that the images are continuous in the time domain, according to the information of the image area corresponding to the pixel which lacks information, in at least one image of the previous and next images of the image to be repaired having the pixel which lacks information.

The foregoing object is achieved according to another aspect of the present invention through the provision of a motion-picture repair apparatus in which a pixel which lacks information is repaired in a motion picture formed of a plurality of continuous images, including: control means for controlling continuity maintaining processing to repair the pixel which lacks information such that the images are continuous in the time domain, according to the information of the image area corresponding to the pixel which lacks information, in at least one image of the previous and next images of the image to be repaired having the pixel which lacks information.

The foregoing object is achieved according to still another aspect of the present invention through the provision of a medium for providing control information to have a control apparatus execute repair processing for repairing a pixel which lacks information in a motion picture formed of a plurality of continuous images, the medium including control information for repairing the pixel which lacks information such that the images are continuous in the time domain, according to the information of the image area corresponding to the pixel which lacks information, in at least one image of the previous and next images of the image to be repaired having the pixel which lacks information.

BRIEF DESCRIPTION OF THE DRAWINGS

FIG. 15 is a flowchart of a third case of the intra-frame image repair method.

DESCRIPTION OF THE PREFERRED EMBODIMENTS

Figure 1A:
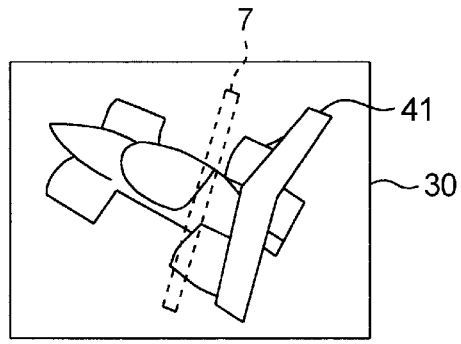
FIGS. 1A–1C are views used for describing a conventional image repair method.
Figure 1B:
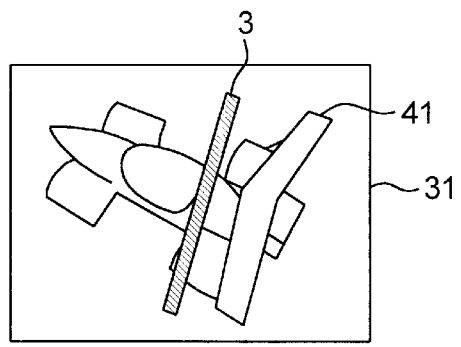
Figure 1C:
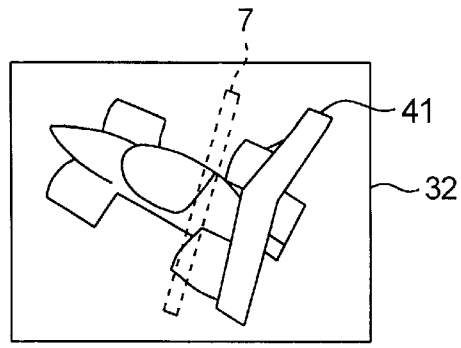
Figure 2A:
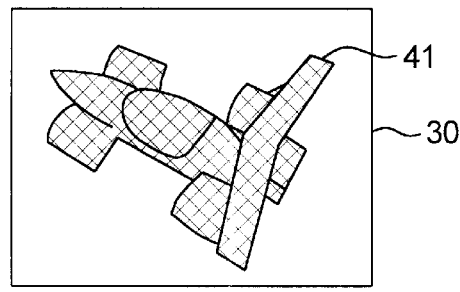
FIGS. 2A–2C are views used for describing a conventional image repair method.
Figure 2B:
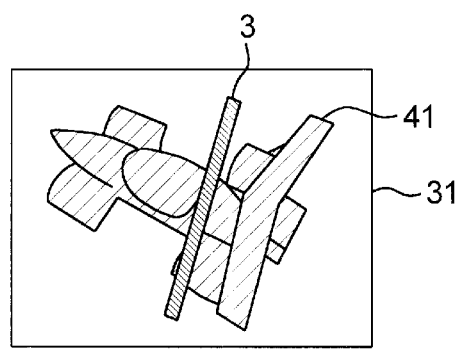
Figure 2C:
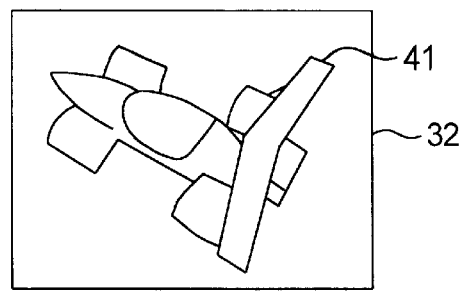
Figure 3A:
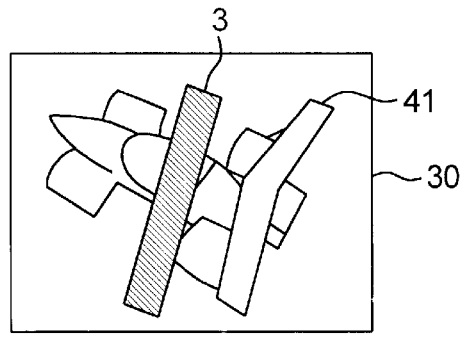
FIGS. 3A–3C are views used for describing a conventional image repair method.
Figure 3B:
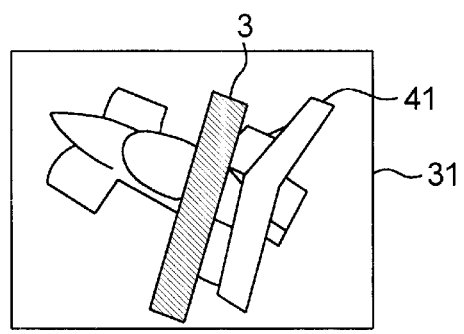
Figure 3C:
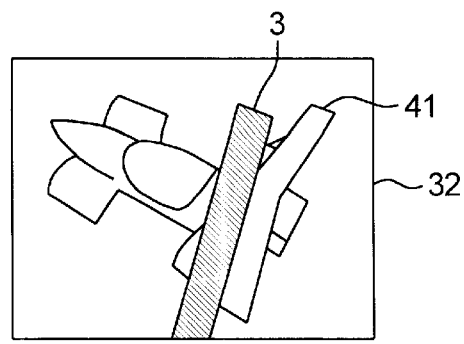

Motion-picture repair methods and a motion-picture repair apparatus according to the present invention will be described below by referring to the drawings.

Figure 4:
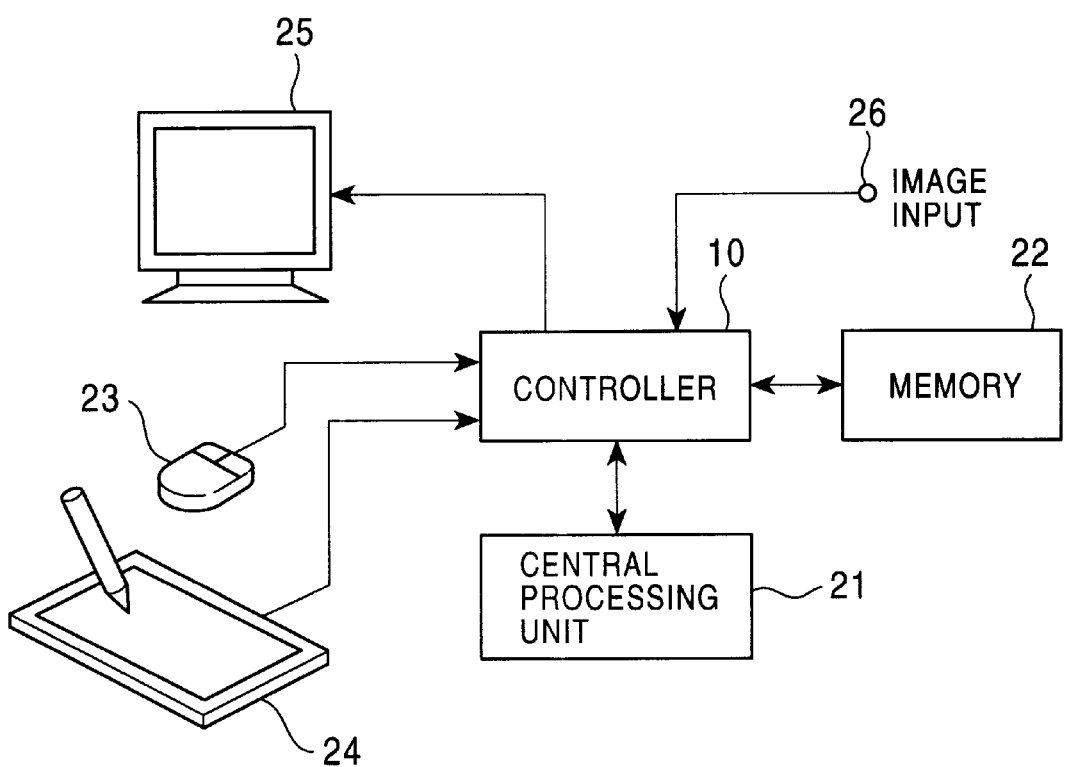
FIG. 4 is a block diagram showing an outlined configuration of a motion-picture repair apparatus.

The motion-picture repair apparatus includes a controller 10 for controlling the entire apparatus, a central processing unit 21 for intensive data calculation, and a memory 22 for storing data, as shown in FIG. 4.

The controller 10 controls each section of the apparatus. The controller 10 performs data transfer with the central processing unit 21 and the memory 22, and executes a series of procedures related to area setting in a motion picture together with the central processing unit 21 and the memory 22. The controller 10 receives data from a mouse 23, a pen and tablet 24, and an image input 26, and outputs data to a CRT 25.

The central processing unit 21 is a processor which performs data calculation intensively. The central processing unit 21 is connected to the controller 10, and performs calculation for data given by the controller 10 under the control of the controller 10.

The memory 22 is a storage section for storing data. The memory 22 is connected to the controller 10, and data is read from or written into the memory 22 under the control of the controller 10. A program for repairing a motion picture is also stored in this memory 22. The memory 22 can be formed of two types of memory devices, such as read only memory (ROM) and random access memory (RAM). It may be formed of either type of memory. When it is formed of two types of memory, a combination of a CD-ROM and a semiconductor memory can be considered.

The repair apparatus has the mouse 23 and the pen and tablet 24 as input means, and the CRT 25 as output means.

The mouse 23 is a pointing device having a casing about as large as that which can be manipulated with a palm. The position of a cursor shown on the CRT 25 is input, for example, when the mouse 23 is slid on a flat plane such as the surface of a desk in the desired direction at the desired length. The mouse 23 transmits the data related to the input position to the controller 10.

The pen and tablet 24 is input means formed of a set of a tablet having almost a flat, rectangular-parallelepiped shape, having a plurality of detecting devices disposed in matrix on one main flat surface, and detecting a position in this matrix, and a pen for inputting a position by tracing with the tip of the pen on the tablet main surface. The pen and tablet 24 transmits the data related to the input position to the controller 10.

The CRT 25 is output means for displaying on a plurality of pixels disposed on the surface of a cathode-ray tube the data related to an image as the image. The CRT 25 receives the data related to an image from the controller 10 and displays the data as the image.

Figure 5:
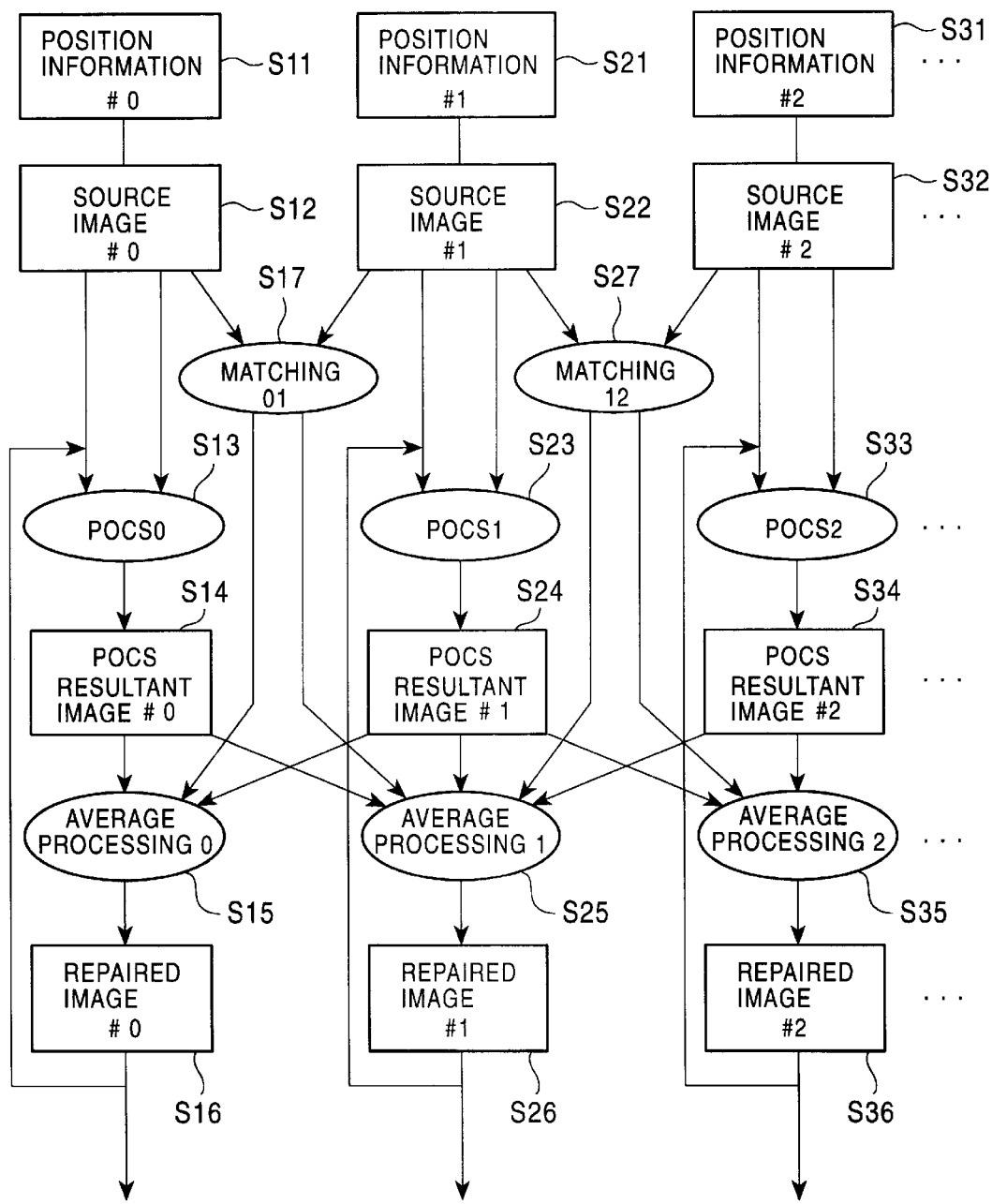
FIG. 5 is a data flow diagram illustrating the processes of a motion-picture repair method.

A series of processes related to motion-picture repair will be described below by referring to a data flow shown in FIG. 5.

In this data flow, rectangular blocks indicate data and oval blocks indicate processing modules. For simplicity, the figure shows processing for the first three frames of a motion picture. For a motion picture longer than this, the illustrated processing is repeated.

Processing modules indicated by "POCSn," where n indicates an integer, that is "POCS0" (S13), "POCS1" (S23), and "POCS2" (S33), specify single-frame repair processing for the n-th frame.

A repair algorithm based on a mathematical principle called projection onto convex sets (POCS), which is described in the Japanese Patent Application Nos. 7-303420 and 8-204776, is used. Details thereof are described in these specifications and a paper written by an inventor of this application and others, "Combining frequency and spatial domain information for fast interactive image noise removal," Anil N. Hirani and Takashi Totsuka, Computer Graphics Proceedings (SIGGRAPH 96), pp. 296–276. A POCSn module execute one cycle of repeated repair calculation.

Figure 6:
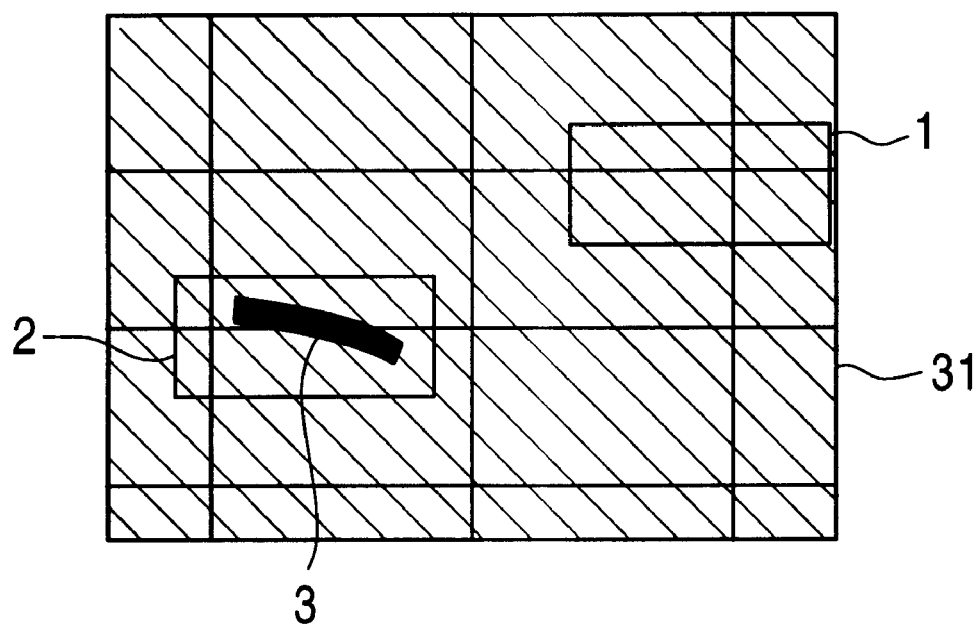
FIG. 6 is a view of an area to be repaired and a reference area both of which are set in a frame.

This algorithm requires a source image to be repaired (having a scratch to be removed) (source image #n in general, source image #0 (S12), source image #1 (S22), and source image #2 (S32) in the figure) and position information of an area to be repaired and an area to be referenced in the source image (position information #n in general, position information #0 (S11), position information #1 (S21), and position information #2 (S31) in the figure). In FIG. 6, there is shown an area 2 to be repaired which includes a scratch 3 (black curve) and a reference area 1 to be used as a specimen or a sample in repair.

In other words, in a frame 31, the scratch 3 extends horizontally at almost the left bottom of the figure. To enclose the scratch 3 in the frame 31, the area 2 to be repaired is set having an almost rectangular shape with each side parallel to the corresponding side of the frame 31. At almost the right top of the frame 31, the reference area 1 having the same shape as the area 2 to be repaired is set such that each side thereof is parallel to the corresponding side of the frame 31.

These quadrilateral areas can be input with the use of an appropriate graphical user interface (GUI).

With one cycle of image repair based on POCS, a result repaired to some extent is obtained. The result is a POCS resultant image #n, which is indicated in the figure by POCS resultant image #0 (S14), POCS resultant image #1 (S24), and POCS resultant image #2 (S34). In a conventional method described in the specification of Japanese Patent Application No. 7-303420, this result is again directly input to a POCSn module to repeat the repair such that the repaired image converges into the desired result. In the present invention, however, a POCS resultant image #n is sent to an average processing module, or average processing n, which is indicated in the figure by average processing 0 (S15), average processing 1 (S25), and average processing 2 (S35). A weighted average is calculated for the area to be repaired and the images corresponding thereto in the previous and next frames and the result is written back to the area to be repaired.

An object in a motion picture is usually moving. Therefore, the corresponding portions in the previous and next frames are not always disposed at the same coordinates. It is required that the corresponding portions be identified in advance. A module called matching n n+1, indicated by matching 01 and matching 12 in the figure, performs this operation.

Figure 7A:
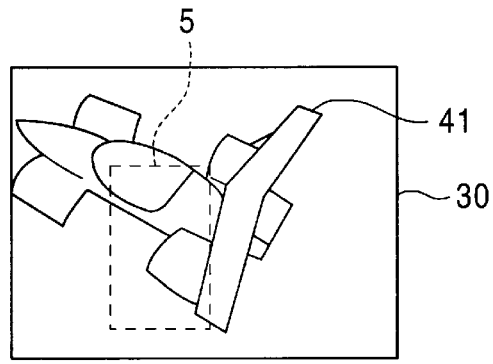
FIGS. 7A–7C are views used for describing corresponding areas set in a plurality of frames.
Figure 7B:
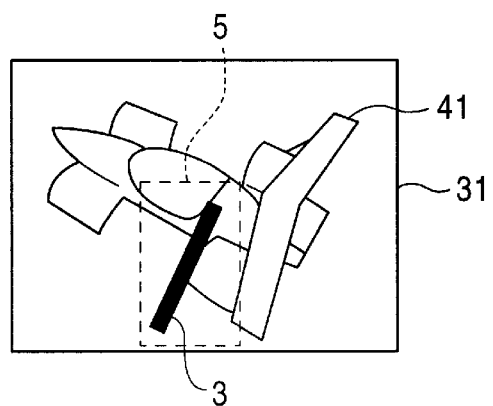
Figure 7C:
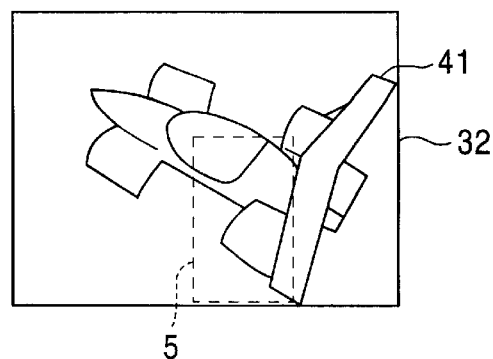

This operation will be described below by referring to FIG. 7. In the figure, A shows the (i−1)-th frame 30. At almost the upper left of the center of the (i−1)-th frame 30, a moving object 41 moving in the right bottom direction is shown. A rectangular area 5 having each side parallel to that of the (i−1)-th frame 30 is set at slightly the lower left of the center of the (i−1)-th frame 30. The area 5 will be described later. In the figure, B shows the i-th frame 31. At slightly below the center of the i-th frame 31, the moving object 41 moving in the lower right direction is shown. An almost rectangular scratch 3 extending almost in the upper right direction is included at slightly the lower left of the center of the i-th frame 31. A rectangular area 2 to be repaired having each side parallel to that of the i-th frame 31 is set at a slightly lower position of the center of the i-th frame 31 so as to enclose the scratch 3. In the figure, C shows the (i+1)-th frame 32. At the lower right of the center of the (i+1)-th frame 32, the moving object 41 moving in the lower right direction is shown. The rectangular area 5 having each side parallel to that of the (i+1)-th frame 32, corresponding to the area 2, is set at a slightly lower right position of the center of the (i+1)-th frame 32.

Block matching is used, for example, to search another frame for the corresponding area. Block matching searches another place for an area most similar to a certain area (block). In the case shown in FIG. 7, an area having the same size as the area 2 to be repaired in the i-th frame 31 is set in the (i−1)-th frame 30, and the sum of the squares of the differences between each pair of pixel values in these areas. To make the sum of the squares smallest, the area is shifted in the (i−1)-th frame 30. The corresponding area 5 is thus obtained, which is shown by a dotted line in the (i−1)-th frame 30. The area indicated by a dotted line in the (i+1)-th frame 32 is also obtained in the same way. Instead of the sum of the squares, the sum of absolute values may be used to perform the same processing.

After the corresponding areas have been determined, the matching 01 module sends the position of the area in the first frame corresponding to the area to be repaired in the 0th frame to the average processing 0 module, and sends the position of the area in the 0th frame corresponding to the area to be repaired in the first frame to the average processing 1 module. The same operation is performed for other frames.

The average processing n module reads images from the previous and next frames with the use of the correspondence relationship obtained in this way, and calculates weighted averages as described above. This calculation is expressed by the following expression, where Image[i] indicates the output of the POCS module (POCSi) in the i-th frame, that is, the image indicated by POCS resultant image #i, and Wi indicates the weight for the i-th frame.

$$W_{n-1}*\text{Image}[n-1]+W_n*\text{Image}[n]+W_{n+1}*\text{Image}[n+1] \quad (1)$$

With the weight being changed, the strength of continuity among adjacent frames can be controlled. Usually, $W_{n-1}$ is set to 0.2, $W_n$ is set to 0.6, and $W_{n+1}$ is set to 0.2.

The weighted average obtained as described above is written back to the area to be repaired, and the POCS resultant image #n is used as is at the outside of the area. The repaired image obtained in this way is indicated in FIG. 5 by repaired image #n, actually specified by repaired image #0 (S16), repaired image #1 (S26), and repaired image #2 (S36) in the figure.

The above description shows one cycle of repeated calculation for image repair. This cycle is repeated to clearly repair the image gradually. When the image converges after repeated calculations, and the repaired image #n is almost identical with the image obtained by the previous repeated calculation, the repeated calculation processing is terminated. Thus, the entire motion picture is repaired.

Figure 8:
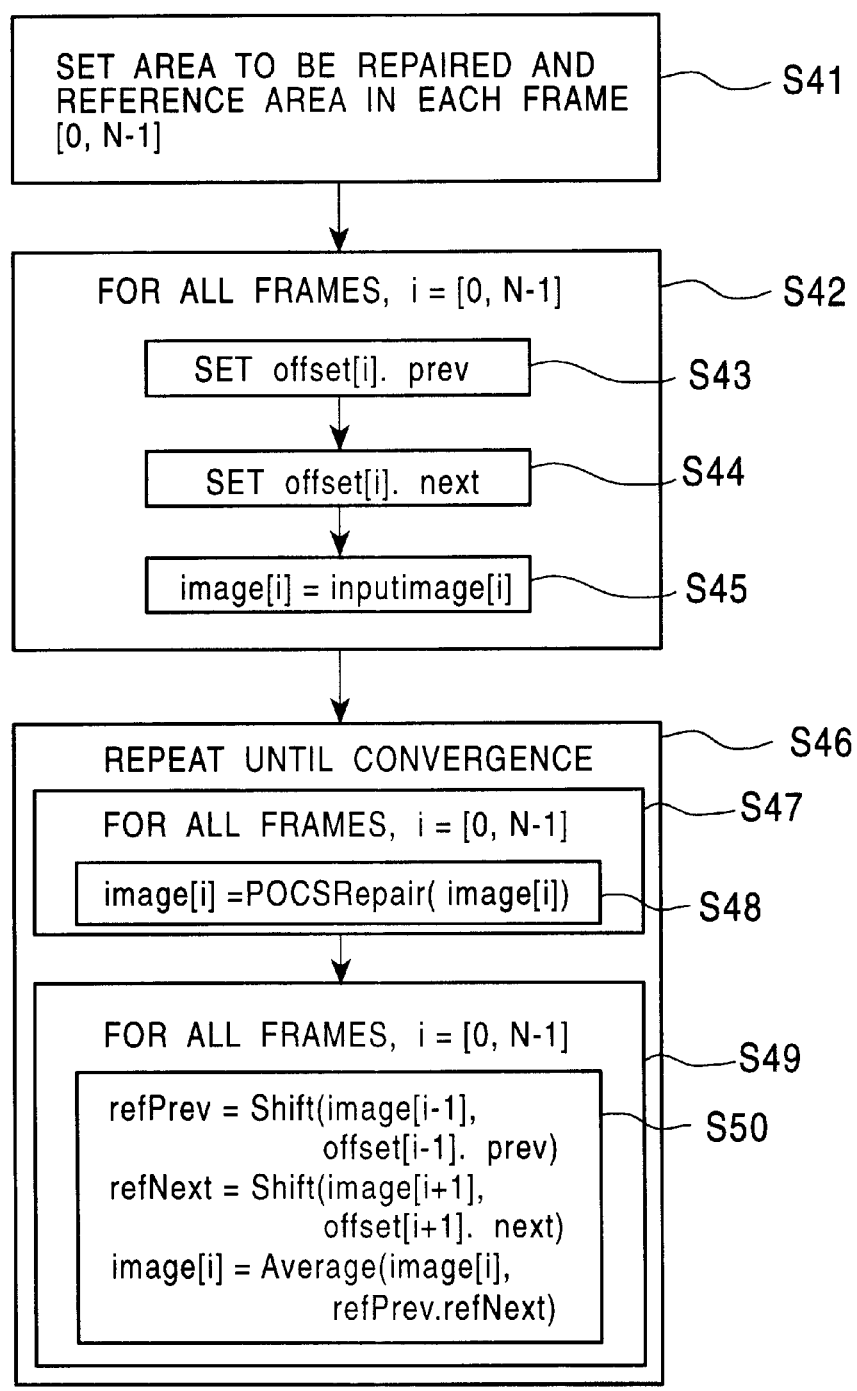
FIG. 8 is a flowchart of a repair method according to a first embodiment.

A first embodiment will be described below by referring to FIG. 8, in which the series of processes for the above motion-picture repair method is implemented by software.

In a first step S41, an area to be repaired in each frame from the 0-th frame to the (N−1)-th frame and a reference area to be referenced are input with the use of a graphical user interface. Then, the procedure proceeds to the next step S42.

In the step S42, the areas on the previous and next frames corresponding to the area to be repaired are searched for. This step plays the role of the matching n n+1 module in FIG. 5. The step S42 is formed of a step S43, a step S44, and a step S45. In the step S42, the step S43 to the step S45 are executed for all frames from the 0th frame to the (N−1)-th frame. In the step S43, the area on the previous frame corresponding to the area to be repaired is searched for, and a coordinate offset (shifted distance from the area to be repaired to the corresponding area) is stored in a variable. In the step S44, the area on the next frame corresponding to the area to be repaired is searched for and a coordinate offset is stored in a variable. In the step S45, an image array "image[i]" which stores an intermediate result is initialized by the value of the source image. When the above processing is executed for all frames from the 0th frame to the (N−1)-th frame, the procedure proceeds to a step S46.

In the step S46, repeated calculation for image repair is performed. The step S46 is formed of a step S47 and a step S49. In the step S46, the steps S47 and S49 are repeated until convergence. The step S47 is formed of a step S48, and the step S49 is formed of a step S50.

In the loop of the step S47, repair inside a frame is performed in the step S48. This operation corresponds to the processing of a POCS module in FIG. 5. This operation is performed for all frames from the 0th frame to the (N−1)-th frame.

In the step S49, weighted average processing in the time domain (previous and next frames) directly related to the present invention is performed. Processing for each frame in the loop is performed in the step S50. In the step S50, the image in the previous frame is shifted by the offset obtained in the step S43. This is for facilitating the next average processing. In the same way, the image in the next frame is shifted by the offset obtained in the step S44. With these operations, the area to be repaired overlaps with the areas in the previous and next frames corresponding thereto at the same coordinates. The weighted average is calculated according to the foregoing expression among the area to be repaired and the corresponding areas in the previous and next frames shifted as described above, and the calculation result is stored again in Image[i]. The foregoing processing is repeatedly performed for the frames from the 0th frame to the (N−1)-th frame, and the step S49 is finished. When the entire image converges (when the sum of the absolute values of the differences between the images is equal to or less than the specified threshold for each frame as compared with the previous cycle of repetition), it is determined that repair has been completed, the step S46 is terminated, and the whole processing is completed.

In the step S50, the image to which average processing has been applied in the first cycle of the repetition in the loop of the step S49 is stored in Image[i−1] for the previous frame at the point of time when average processing is to be performed, and since the step S50 has not yet been finished, the images to which average processing has not yet been applied are stored in Image[i] for the image to be currently being repaired and Image[i+1] for the next frame. The advanced data is used for Image[i−1]. This rather makes data convergence to be performed faster and there is no problem.

As described above, with the repair inside a frame by the use of the conventional method and the average processing with the previous and next frames according to the present invention being alternately performed, repair with a good continuity in a plurality of frames, that is, high-quality repair for a motion picture can be performed.

In the above embodiment, repair processing is applied to all frames at the same time. Therefore, repair continuity is extremely good, but the resultant images cannot be obtained until the entire processing is finished.

Figure 9:
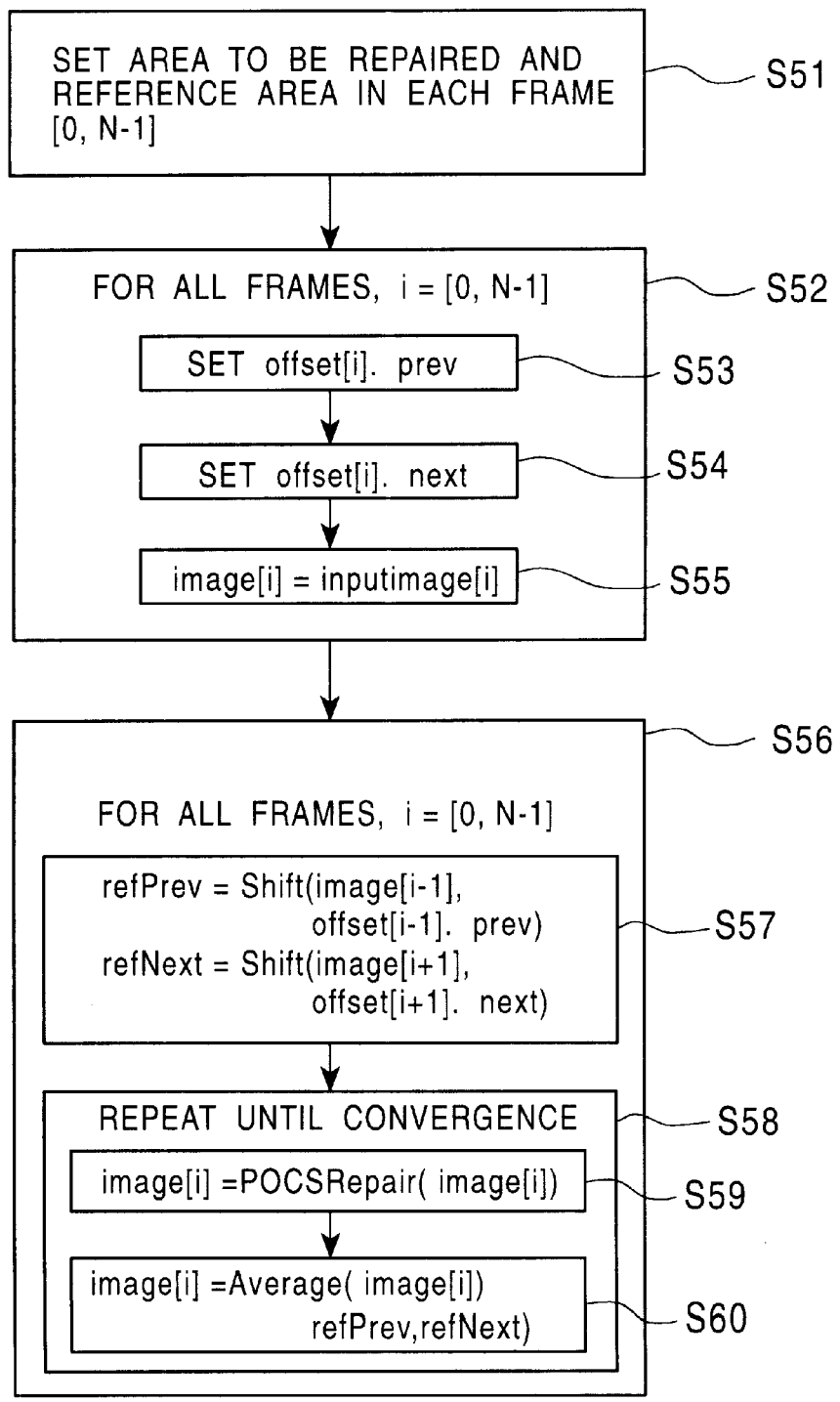
FIG. 9 is a flowchart of a repair method according to a second embodiment.

A second embodiment will be described below by referring to a flowchart shown in FIG. 9, in which a method which allows a result to be output one after another to the operator while each frame is sequentially processed is implemented by software.

In a first step S51, an area to be repaired in each frame from the 0-th frame to the (N−1)-th frame and a reference area to be referenced are input with the use of a graphical user interface. Then, the procedure proceeds to the next step S52.

In the step S52, the areas on the previous and next frames corresponding to the area to be repaired are searched for. This step plays the role of the matching n n+1 module in FIG. 5. The step S52 is formed of a step S53, a step S54, and a step S55. In the step S52, the step S53 to the step S55 are executed for all frames from the 0th frame to the (N−1)-th frame. In the step S53, the area on the previous frame corresponding to the area to be repaired is searched for, and a coordinate offset (shifted distance from the area to be repaired to the corresponding area) is stored in a variable. In the step S54, the area on the next frame corresponding to the area to be repaired is searched for and a coordinate offset is stored in a variable. In the step S55, an image array "image[i]" which stores an intermediate result is initialized by the value of the source image. When the foregoing processing is executed for all frames from the 0th frame to the (N−1)-th frame, the procedure proceeds to a step S56.

These steps S51 and S52 are identical with the above steps S41 and S42. The main section of this repair processing is the step S56. The algorithm used in the step differs from that used in the above embodiment, which was described by referring to FIG. 8.

The step S56 is formed of a step S57 and a step S58. In the step S56, the steps S57 and S58 are executed for all frames from the 0th frame to the (N−1)-th frame. The step S58 is formed of a step S59 and a step 60.

In the loop of the step S57, the image in the previous frame is shifted by the offset obtained in the step S53, and the same operation is applied to the image in the next frame. This operation is the same as that at the first part of the step S50 shown in FIG. 8, that is, in the first embodiment. Then, in the step S58, the repair processing is performed with repeated calculation. Repair inside a frame is performed in the step S59. This operation is the same as that in a POCS module shown in FIG. 5 and that in the step S48 shown in FIG. 8. Then, average processing is performed in the step S60. This processing corresponds to that performed in the step S50 shown in FIG. 8, but differs in that, if the corresponding area refNext in the next frame includes a pixel which lacks information due to a scratch, average processing is performed without using the information of the pixel.

When the correct value of each pixel in the corresponding area refNext in the next frame is known, it is used as in the first embodiment. If the correct value of a pixel in the corresponding area refNext in the next frame is unknown, average processing is performed with the use of the following expression.

$$K_{n-1}*\text{Image}[n-1]+K_n*\text{Image}[n] \qquad (2)$$

Figure 10A:
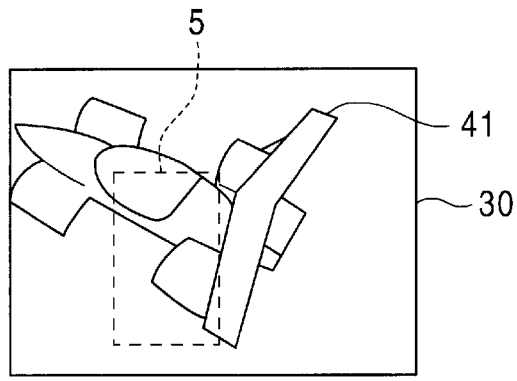
FIGS. 10A–10C are views showing how a pixel area with a width of one pixel is taken out from the area to be repaired.
Figure 10B:
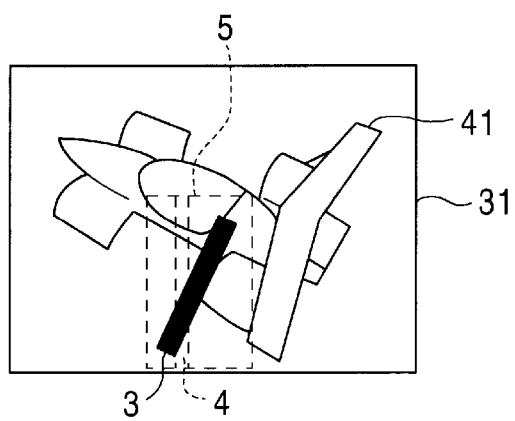
Figure 10C:
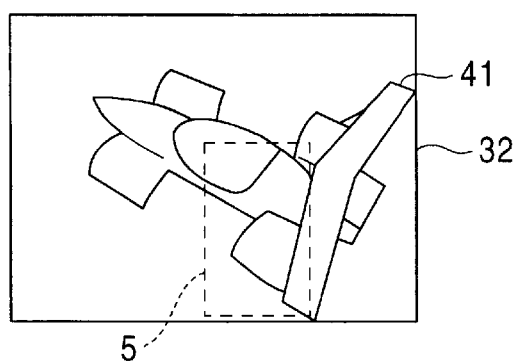

FIG. 10 shows in detail a condition in which the i-th frame 31 is being repaired. In the figure, A indicates the (i−1)-th frame 30, B indicates the i-th frame 31, and C indicates the (i+1)-th frame 32. Since the images shown in A to C in the figure, namely in the frames 30 to 32, are the same as those shown in A to C in FIG. 7, descriptions thereof will be omitted. The area 2 to be repaired shown in the i-th frame 31 illustrated in B in the figure includes an area 4 having a width of one pixel and extending in the vertical direction in the figure.

Figure 11:
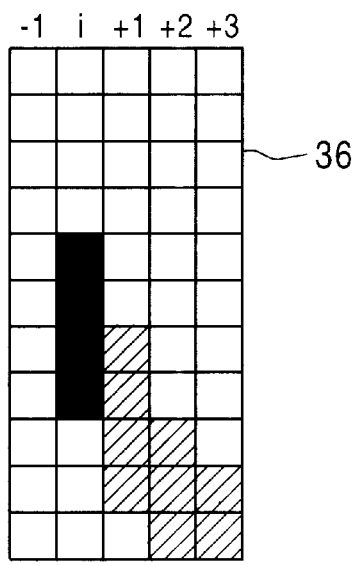
FIG. 11 is a view in which areas with a width of one pixel taken out from frames are arranged.

In the second embodiment, since the repair processing is applied to frames sequentially starting from an earlier frame, the (i−1)-th frame 30 has been repaired. FIG. 11 shows the area to be repaired and the corresponding areas in adjacent frames taken at a width of one pixel and arranged. The columns in the figure correspond, from the leftmost column to the rightmost column, to the (i−1)-th frame, the i-th frame, the (i+1)-th frame, the (i+2)-th frame, and the (i+3)-th frame. In the figure, black pixels indicate those which lack information due to a scratch in the i-th frame 31, and hatched pixels indicate pixels which lack information in the subsequent frames. The four black pixels in the figure are to be repaired in the i-th frame 31, and correspond to the area 4 having a width of one pixel. Among them, since the pixel-value information corresponding to the upper two pixels exists in the (i−1)-th frame 30 and the (i+1)-th frame 32, repair is performed according to the expression (1). The pixel information may exist in the source image in the (i−1)-th frame 30. The information may be generated in repair processing for the (i−1)-th frame 30.

As to the two lower pixels, since the corresponding pixel information does not exist in the (i+1)-th frame 32 (cannot be used because it is not a correct value due to a scratch), average processing is performed according to the expression (2).

As described above, the average processing method is switched in the step S60 according to whether the correct value of a pixel is known. This is the difference with the average processing in the first embodiment. According to the method in the second embodiment, since each frame is sequentially repaired, a repaired frame can be shown on the screen for checking, improving the ease of operations.

In the second embodiment, the processing is performed sequentially in the direction in which the frame number increases (in the ascending order). The same processing can be performed sequentially in the direction in which the frame number decreases (in the descending order). In this case, the average-processing expression needs to be switched according to whether the correct value of a pixel in the (i−1)-th frame is known. Since average processing is performed, the information of a pixel in a frame is transferred while gradually attenuated, in the direction the processing proceeds irrespective of whether the processing is performed in the ascending order or the descending order of the frame number. Therefore, when an image having a slight scratch or no scratch is disposed at the top, it is better to perform the processing in the ascending order of the frame number, which is likely to transfer the information of this frame. Conversely, when an image having a slight scratch is disposed at the last of a motion picture, it is better to perform the processing in the descending order.

The ascending-order processing and the descending-order processing can be combined to achieve further high-quality repair. Typically, the ascending-order repair is performed first, and then, with its result as the starting point, the descending-order repair is further performed. The reason why repair quality is improved with this method will be described by the use of FIG. 12.

Figure 12:
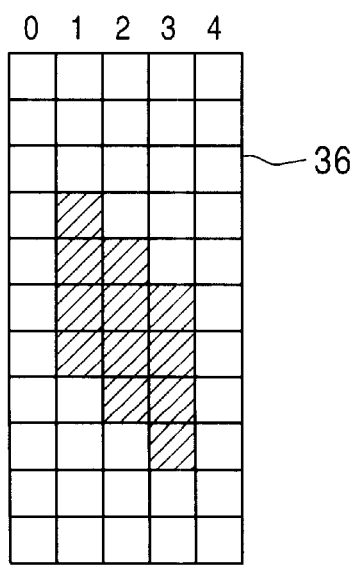
FIG. 12 is a view used for describing a difference between pixel repair in the ascending order of frame numbers and that in the descending order of frame numbers.

FIG. 12 shows areas in a plurality of continuous frames taken at a width of one pixel and arranged in the same way as in FIG. 11. Hatched pixels lack information. In other words, the correct values thereof are unknown. The numbers at the top indicate frame numbers. In this case, the 0th frame and the fourth frame have no scratch, and the intermediate frames have scratches. When only the ascending-order repair is performed, the information of the 0th frame is transferred to the subsequent frames while gradually attenuated, and continuity is maintained and the correct pixel values are transferred. As to the fourth frame, although the correct pixel values are known, the information is only used for repair of the third frame because the previous frames have been repaired. If descending-order repair is additionally performed, however, the information of the fourth frame is gradually transferred to the previous frames, and the information of the frames which have the correct values is transferred to the surrounding frames without loss. As a result, higher-quality repair is implemented.

Figure 13:
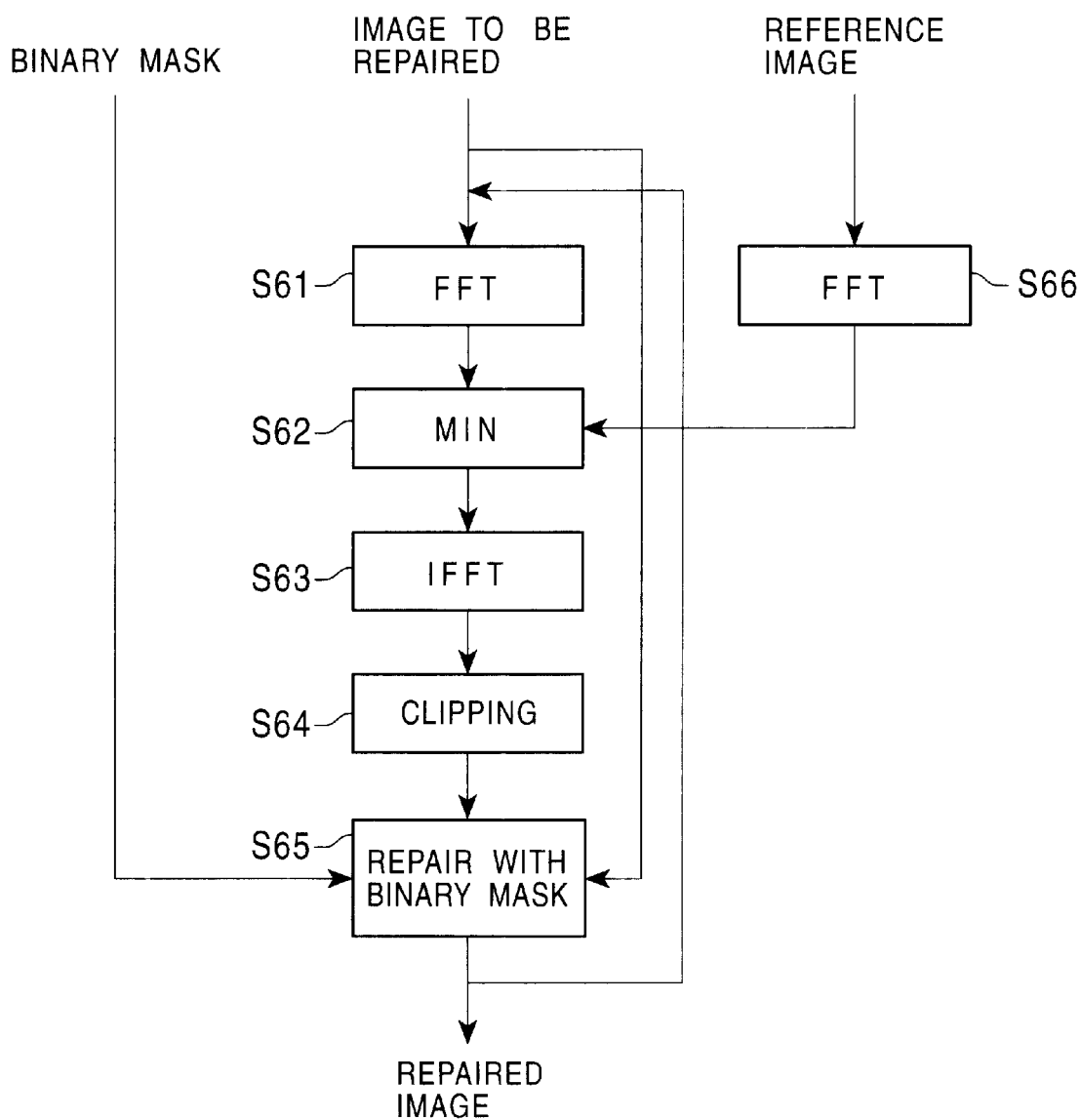
FIG. 13 is a flowchart of a first case of an intra-frame image repair method.

The algorithm of a repair method for noise in an image described in the specifications of Japanese Patent Application Nos. 7-303420 and 8-204776, which is the image repair method corresponding to a POCSn module in general, indicated in FIG. 5 as POCS0 (S13), POCS1 (S23), and POCS2 (S33), will be described below. A first case of the algorithm will be described first by referring to a flowchart shown in FIG. 13.

In a first step S61, fast Fourier transform (FFT) is applied to an image to be repaired, and the magnitude (M2) and the phase (P2) calculated in FFT are sent to the next step S62.

The image to be repaired is a rectangular image area selected by the user around a scratch.

In a step S66, fast Fourier transform (FFT) is applied to a reference image. The FFT outputs include the phase (P1) and the magnitude (M1) of the reference image in Fourier transform. The phase (P1) is ignored here, and the magnitude (M1) is used in the next step S62.

The reference image is a rectangular image area which has exactly the same size as the image to be repaired, which is similar to the image to be repaired, and which does not include the image area around the scratch selected by the user.

In the step S62, the minimum magnitude of the magnitudes M1 and M2 is calculated. The magnitude M1 is obtained from the FFT of the reference image. The magnitude M2 is obtained from the FFT of the image to be repaired. The minimum magnitude is calculated for all frequency components except the DC component. As for the DC component, the value of the magnitude M2 is selected. The new magnitude obtained by the calculation of the minimum value is sent to the next step S63, in which inverse Fourier transform is performed. The phase information P2, which has been obtained in the FFT of the image to be repaired, is not changed and sent to the next step S63.

In the step S63, inverse fast Fourier transform (IFFT) is performed with the use of the magnitude and the phase output from the preceding step S62. The result of IFFT is sent to a step S64.

In the step S64, an input value is set to a real number. The input value is a matrix which may have some complex numbers. In the matrix, such complex numbers are set to zero. Since a real number may be out of the range from 0 to 255, clipping is performed. If a number is zero or less, it is set to zero. If a number is 255 or more, it is set to 255. Otherwise, nothing is performed. Then, the procedure proceeds to the next step S65.

In the step S65, repair is performed with the use of a binary mask. In other words, a pixel obtained in the preceding step is combined with a pixel in the image to be repaired. The binary mask is used for discriminate the selected area to be repaired from the other areas in the image. When each pixel in the area to be repaired is set to 0 and each pixel in the other areas is set to 1, for example, the area to be repaired is discriminated. The value of a pixel distant from the binary mask is set to that of the image to be repaired since it has been found that noise does not exist there. In the area for which the values of the binary mask are set to 0, since the image to be repaired has noise and better values have been calculated, the better values are used.

The binary mask is written (painted) over a noise area by the user. It has a sufficient size to cover noise pixels, but is not required to have exactly the same shape.

The user can specify the number of times the loop ranging from the step S61 to the step S65 is executed.

To eliminate the drawbacks of the above conventional image repair method and to obtain a successful repair result against lack of information at a large, continuous area, there are known algorithms described in the specifications of the Japanese Patent Application Nos. 7-303420 and 8-204776. These algorithms feature in that processing for clearly repairing an image is performed in both frequency domain and spatial domain. In these methods, the major features (overall shade level and large pattern) of an image is repaired in the frequency domain with a reference area selected separately being referenced, and details, such as a portion having no information and continuity with surrounding areas, are repaired in the spatial domain.

Figure 14:
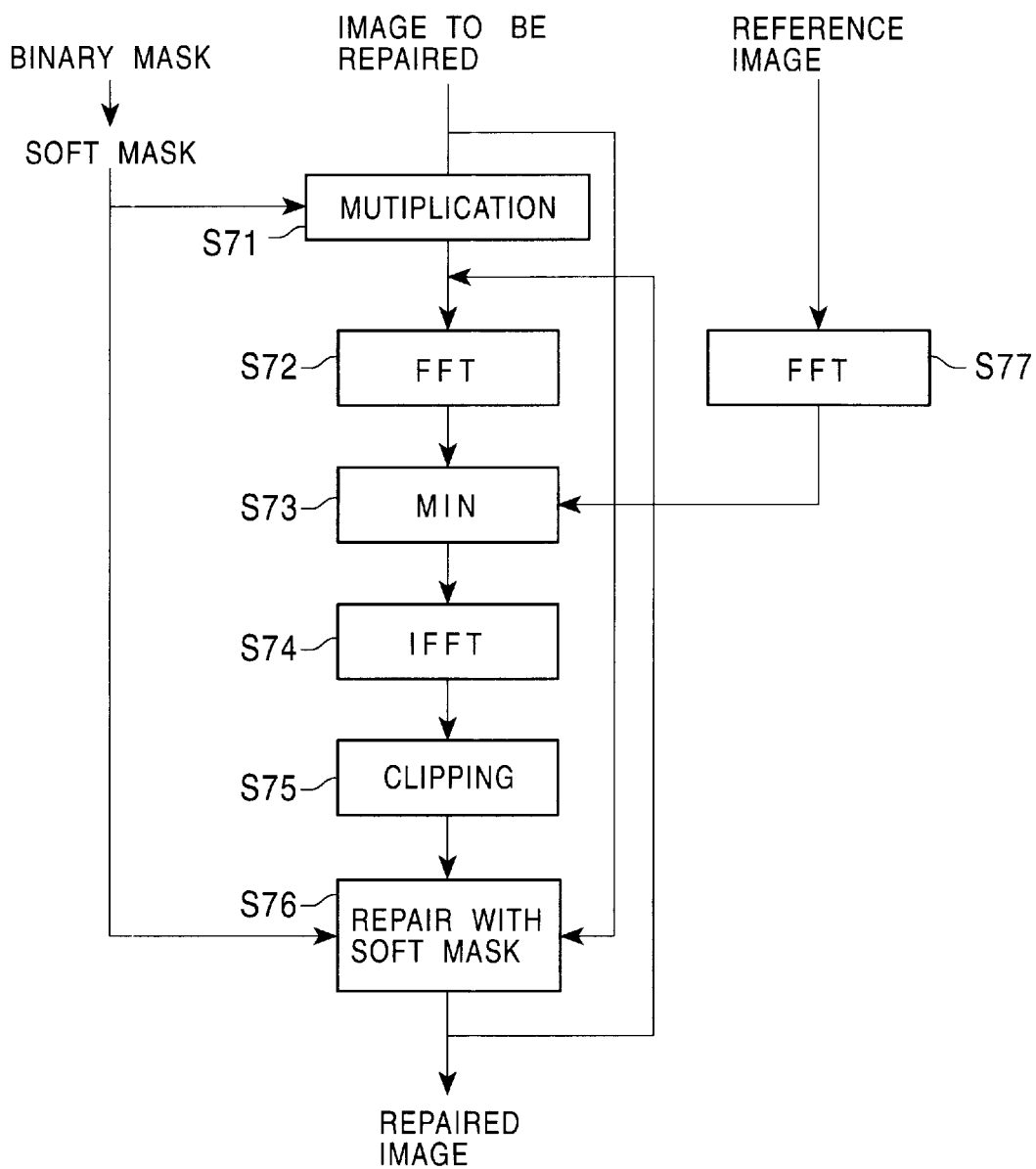
FIG. 14 is a flowchart of a second case of the intra-frame image repair method.

The image repair method described in the above applications will be described below in a second case by referring to a flowchart shown in FIG. 14.

In a first step S71, the image to be repaired is multiplied by a soft noise mask. As a result, a scratch is covered by a black area of the soft noise mask. In the region of the soft noise mask, since the image to be repaired is multiplied by factors which are almost 0 in the vicinity of the edge of noise, which are almost 1 at positions away from the edge of the soft noise mask by some pixels, and which have an intermediate value between 0 and 1 at positions therebetween, the values of the source pixels are reduced. The multiplication result is called a masked image to be repaired. Then, the procedure proceeds to the next step S72.

The image to be repaired is a rectangular image area around a scratch selected by the user. The soft noise mask is a mask having a soft edge, generated from a binary mask written over by the user. The binary mask is a mask written (painted) over a scratch by the user. The binary mask has a sufficient size to cover a noise pixel, but is not required to have exactly the same shape.

To generate a soft noise mask, the values of the soft noise mask are set to 0 within the binary mask. Outside the binary mask, the values of the soft noise mask are set to Gaussian-function values between 0 and 1. In other words, the value of the soft noise mask is set to $1-\exp(-k*d*d)$ at a pixel outside the binary mask, where "d" indicates the distance from the binary mask, and k is a constant which can be set by the user to make the soft edge of the soft noise mask steep or gentle. The constant k is generally set to 0.15. When the distance "d" from the binary mask is determined, one value of the soft noise mask is obtained. The inventors have founded that a distance of five pixels is suited.

In the step S72, fast Fourier transform (FFT) is applied to the masked image to be repaired, and the magnitude (M2) and the phase (P2) calculated in FFT are sent to the next step S73.

In a step S77, fast Fourier transform (FFT) is applied to a reference image 1. The FFT outputs include the phase (P1) and the magnitude (M1) of the reference image in Fourier transform. The phase (P1) is ignored here, and the magnitude (M1) is used subsequently. The magnitude is sent to a step S73.

The reference image 1 is a rectangular image area which has exactly the same size as the image to be repaired, which is similar to the image to be repaired, and which does not include the image area around the scratch selected by the user. This selected area is set to a reference area. The relative position of a special line in the reference area differs from that of the special line in the area to be repaired.

In the step S73, the minimum magnitude of the magnitudes M1 and M2 is calculated. The magnitude M1 is obtained from the FFT of the reference image. The magnitude M2 is obtained from the FFT of the masked image to be repaired. The minimum magnitude is calculated for all frequency components except the DC component. As for the DC component, the value of the magnitude M2 is selected. The new magnitude obtained by the calculation of the minimum value is sent to the next step S74, in which inverse Fourier transform is performed. The phase information P2, which has been obtained in the FFT of the masked image to be repaired, is not changed and sent to the next step S74.

In the step S74, inverse fast Fourier transform (IFFT) is performed with the use of the magnitude and the phase obtained in the preceding step S73. The result of IFFT is sent to the next step S75.

In the step S75, an input value is set to a real number. The input value is a matrix which may have some complex numbers. In the matrix, such complex numbers are set to zero. Since a real number may be out of the range from 0 to 255, clipping is performed. If a number is zero or less, it is set to zero. If a number is 255 or more, it is set to 255. Otherwise, nothing is performed. Then, the result is sent to the next step S76.

In the step S76, soft-mask repair is performed in which a pixel obtained in the preceding step S75 is combined with a pixel in the image to be repaired. The value of a pixel distant from the soft noise mask should be set to that of the image to be repaired since it is known that noise does not exist at that position. In an area for which the values of the soft noise mask are 0, since the image to be repaired has noise and better values have been calculated, the better values are used. In an area in which the values of the soft noise mask are between 0 and 1, the value calculated in the preceding step and that of the image to be repaired are combined. These three types of processing (processing corresponding to the values of the soft noise mask, 0, 1, and that between 0 and 1) can be defined in the following way. The new value of a pixel at a position is $m*r_0+(1-m)*r$, where "m" indicates the value of the soft noise mask at the position, "$r_0$" indicates the value of the image to be repaired at that position, and "r" indicates the value at the position obtained in the preceding step.

The user can specify the number of times the loop ranging from the step S72 to the step S76 is executed.

A third case of the image repair method described in the above specifications will be described below by referring to a flowchart shown in FIG. 15.

In a first step S81, an image to be repaired is multiplied by a noise mask. This noise mask may be either a binary mask or a soft-edge mask.

When a binary mask is used as the noise mask, actual noise in the image to be repaired is covered by a black area. Outside this area, a portion without noise exists. As the result of the multiplication, a masked image to be repaired is obtained. On the other hand, when a soft noise mask is used, in the region of the soft noise mask, since the image to be repaired is multiplied by factors which are almost 0 in the vicinity of the edge of noise, which are almost 1 at positions away from the edge of the soft noise mask by some pixels, and which have an intermediate value between 0 and 1 at positions therebetween, the values of the source pixels are reduced. The multiplication result is called a masked image to be repaired. Then, the procedure proceeds to the next step S82.

In the step S82, the masked image to be repaired is divided into two images, a high-pass-filtered, masked image to be repaired and a low-pass-filtered, masked image to be repaired. The low-pass-filtered, masked image to be repaired is not sent to the next step S83, but sent to a step S88. Only the high-pass-filtered, masked image to be repaired is directly sent to the next step S83.

In the step S83, fast Fourier transform (FFT) is applied to the high-pass-filtered, masked image to be repaired, and the magnitude (M2) and the phase (P2) calculated in FFT are sent to the next step.

On the other hand, in a step S90, a reference image is filtered by a low-pass filter to generate a low-pass-filtered reference image and a high-pass-filtered reference image. The low-pass-filtered reference image is ignored and the high-pass-filtered reference image is input to the next step S91.

In the step S91, fast Fourier transform (FFT) is applied to the high-pass-filtered reference image. The FFT outputs include the phase and the magnitude (M1) of the high-pass-filtered reference image in Fourier transform. The phase is ignored here, and the magnitude (M1) is sent to the next step S84.

In the step S84, the minimum magnitude of the magnitudes M1 and M2 is calculated. The magnitude M1 is obtained from the FFT of the reference image. The magnitude M2 is obtained from the FFT of the high-pass-filtered, masked image to be repaired. The new magnitude obtained by the calculation of the minimum value is sent to the next step S85, in which inverse Fourier transform is performed. The phase information P2, which has been obtained in the FFT of the high-pass-filtered, masked image to be repaired, is not changed and sent to the next step S85.

In the step S85, inverse fast Fourier transform (IFFT) is performed with the use of the magnitude and the phase obtained in the preceding step S84. The procedure proceeds to a step S86.

In the step S86, an input value is set to a real number and clipping is performed. Then, the procedure proceeds to a step S87.

In the step S87, repair with a soft mask is performed, in which a pixel obtained in the step S81 is combined with a pixel of the high-pass-filtered, masked image to be repaired generated in the step S82. Repair with a binary mask can be performed with the use of the binary mask, instead of the soft noise mask. Then, the procedure proceeds to a step S88. The procedure for binary-mask repair is indicated by dotted lines in the figure.

In the step S88, the output of the preceding step S87 is merged with the low-pass-filtered, masked image to be repaired obtained in the step S82. They are merged just by adding the two images. Then, the procedure proceeds to the next step S89.

In the step S89, clipping is performed. If a pixel input to this step has a value more than 255, it is set to 255. Otherwise, nothing is performed.

The user can specify the number of times the loop ranging from the step S82 to the step S89 is executed.

In the foregoing way, the image repair extremely better than the conventional one can be performed by using separately the frequency domain, in which a general feature can be easily expressed, and the spatial domain, in which a local feature can be easily expressed.

As described above, image repair can be applied to wide fields in which a digital image is handled. The above motion-picture repair method eliminates the drawbacks generated when the conventional method is applied to a motion picture to be repaired, and provides high-quality image repair.

In the above motion-picture repair method, continuity is given to motion-picture repair by average processing among the corresponding portions in adjacent frames with the use of weighted averages, and high-quality image repair is allowed.

Frames are repaired sequentially and average processing is applied to a frame not yet repaired only when pixel information exists (correct value is known). With these operations, continuity is maintained in a motion picture and repair is sequentially finished in units of frames. Therefore, without waiting for the entire motion picture to be repaired, repaired frames can be used and ease of operations is improved.

With a combination of repair in the ascending order of frame numbers and that in the descending order of frame numbers in sequential frame repair, since the information of a pixel for which a correct value is known can be efficiently transferred to the adjacent frames, higher-quality repair is allowed.

What is claimed is:

1. A motion-picture repair method in which a pixel which lacks information is repaired in a motion picture formed of a plurality of continuous images, comprising:

a continuity maintaining step for repairing the pixel which lacks information such that the images are continuous in the time domain, according to the information of the image area corresponding to the pixel which lacks information, in at least one image of the previous and next images of the image to be repaired having the pixel which lacks information, wherein, if the image area corresponding to the pixel which lacks information, in the previous or next image of the image to be repaired lacks pixel information, when the corresponding image has been repaired, said continuity maintaining step performs continuity maintaining processing according to the pixel values of the repaired image.

2. A motion-picture repair method according to claim 1, wherein said continuity maintaining step ensures continuity by obtaining a weighted average of the image area corresponding to the pixel which lacks information, in at least one image of the previous and next images of the image to be repaired having the pixel which lacks information.

3. A motion-picture repair method according to claim 1, further comprising an intra-image repair step for performing repair processing with the use of the information of the image to be repaired itself having the pixel which lacks information, wherein said intra-image repair step and said continuity maintaining step are repeatedly performed to repair the motion picture.

4. A motion-picture repair method according to claim 1, further comprising a repair step for performing repair processing for the pixel information of the image to be repaired having the pixel which lacks information, wherein said repair step and said continuity maintaining step are repeatedly performed to repair the motion picture.

5. A motion-picture repair method according to claim 4, wherein said repair step is applied in parallel to a plurality of images to be repaired having pixels which lack information, and then said continuity maintaining step is applied to each of the images to be repaired to which said repair step has been applied.

6. A motion-picture repair method according to claim 4, wherein said repair step and said continuity maintaining step are applied in this order to a plurality of images to be repaired having pixels which lack information.

7. A motion-picture repair method according to claim 1, wherein, if the image area corresponding to the pixel which lacks information, in the previous or next image of the image to be repaired lacks pixel information, said continuity maintaining step performs continuity maintaining processing without using the pixel information of the corresponding image area.

8. A motion-picture repair method according to claim 1, wherein the image to be repaired is sequentially selected in the forward direction of time, and said continuity maintaining step repairs the image to be repaired with the use of the corresponding image area at the new side in time when its pixel information exists, as well as with the use of an image area in the old side in time which has been repaired.

9. A motion-picture repair method according to claim 1, wherein the image to be repaired is sequentially selected in the reverse direction of time, and said continuity maintaining step repairs the image to be repaired with the use of the corresponding image area at the old side in time when its pixel information exists, as well as with the use of an image area in the new side in time which has been repaired.

10. A motion-picture repair method according to claim 1, wherein a forward-direction step in which the image to be repaired is sequentially selected in the forward direction of time, and said continuity maintaining step repairs the image to be repaired with the use of the corresponding image area at the new side in time when its pixel information exists, as well as with the use of an image area in the old side in time which has been repaired, and a reverse-direction step in which the image to be repaired is sequentially selected in the reverse direction of time, and said continuity maintaining step repairs the image to be repaired with the use of the corresponding image area at the old side in time when its pixel information exists, as well as with the use of an image area in the new side in time which has been repaired, are alternately performed.

11. A motion-picture repair apparatus in which a pixel which lacks information is repaired in a motion picture formed of a plurality of continuous images, comprising:

control means for controlling continuity maintaining processing to repair the pixel which lacks information such that the images are continuous in the time domain, according to the information of the image area corresponding to the pixel which lacks information, in at least one image of the previous and next images of the image to be repaired having the pixel which lacks information, wherein, if the image area corresponding to the pixel which lacks information, in the previous or next image of the image to be repaired lacks pixel information, when the corresponding image has been repaired, said control means performs the continuity maintaining processing according to the pixel values of the repaired image, and wherein the control means at least includes an input device.

12. A motion-picture repair apparatus according to claim 11, wherein said control means ensures continuity by obtaining a weighted average of the image area corresponding to the pixel which lacks information, in at least one image of the previous and next images of the image to be repaired having the pixel which lacks information.

13. A motion-picture repair apparatus according to claim 11, wherein said control means repairs the motion picture by repeatedly executing intra-image repair processing for performing repair processing with the use of the information of the image to be repaired itself having the pixel which lacks information, and the continuity maintaining processing.

14. A motion-picture repair apparatus according to claim 11, wherein said control means repairs the motion picture by repeatedly executing repair processing for the pixel information of the image to be repaired having the pixel which lacks information, and the continuity maintaining processing.

15. A motion-picture repair apparatus according to claim 14, wherein said control means applies the repair processing in parallel to a plurality of images to be repaired having pixels which lack information, and then performs the continuity maintaining processing to each of the images to be repaired to which said repair processing has been applied.

16. A motion-picture repair apparatus according to claim 14, wherein said control means applies the repair processing and the continuity maintaining processing to a plurality of images to be repaired having pixels which lack information in this order.

17. A motion-picture repair apparatus according to claim 11, wherein, if the image area corresponding to the pixel which lacks information, in the previous or next image of the image to be repaired lacks pixel information, said control means performs the continuity maintaining processing without using the pixel information of the corresponding image area.

18. A motion-picture repair apparatus according to claim 11, wherein said control means sequentially selected the image to be repaired in the forward direction of time, and performs the continuity maintaining processing with the use of the corresponding image area at the new side in time when its pixel information exists, as well as with the use of an image area in the old side in time which has been repaired.

19. A motion-picture repair apparatus according to claim 11, wherein said control means sequentially selects the image to be repaired in the reverse direction of time, and performs the continuity maintaining processing with the use of the corresponding image area at the old side in time when its pixel information exists, as well as with the use of an image area in the new side in time which has been repaired.

20. A motion-picture repair apparatus according to claim 11, wherein said control means alternately performs forward-direction processing in which the image to be repaired is sequentially selected in the forward direction of time and the continuity maintaining processing is performed with the use of the corresponding image area at the new side in time when its pixel information exists, as well as with the use of an image area in the old side in time which has been repaired, and reverse-direction processing in which the image to be repaired is sequentially selected in the reverse direction of time and the continuity maintaining step is performed with the use of the corresponding image area at the old side in time when its pixel information exists, as well as with the use of an image area in the new side in time which has been repaired.

21. A medium for providing control information to have a control apparatus execute repair processing for repairing a pixel which lacks information in a motion picture formed of a plurality of continuous images, comprising control information for repairing the pixel which lacks information such that the images are continuous in the time domain, according to the information of the image area corresponding to the pixel which lacks information, in at least one image of the previous and next images of the image to be repaired having the pixel which lacks information, wherein, if the image area corresponding to the pixel which lacks information, in the previous or next image of the image to be repaired lacks pixel information, when the corresponding image has been repaired, said control apparatus performs the continuity maintaining processing according to the pixel values of the repaired image.

\* \* \* \* \*